March 9, 1937.  C. E. CHANEY  2,073,141
DIRECTION INDICATING SWITCH
Filed May 11, 1934  2 Sheets-Sheet 1
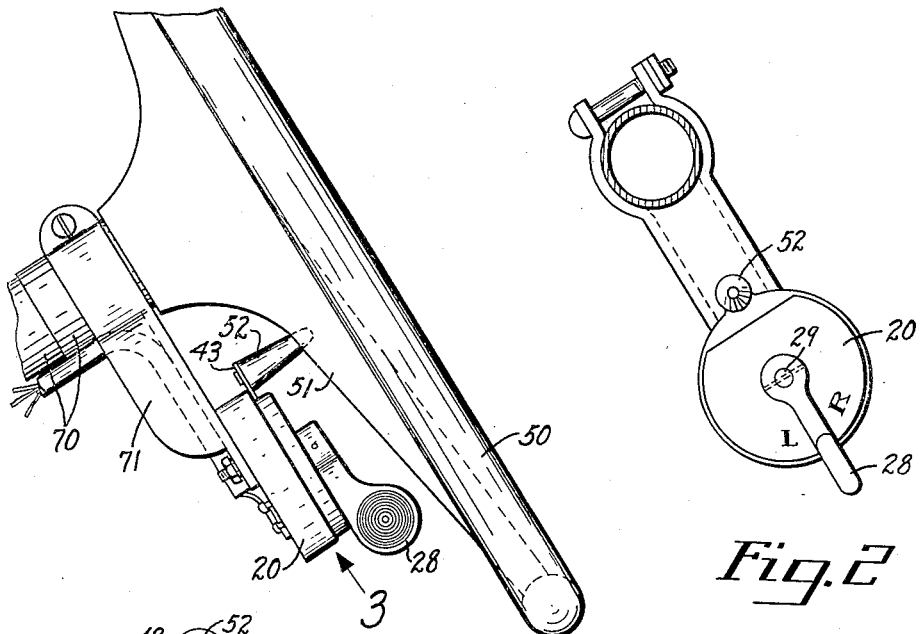
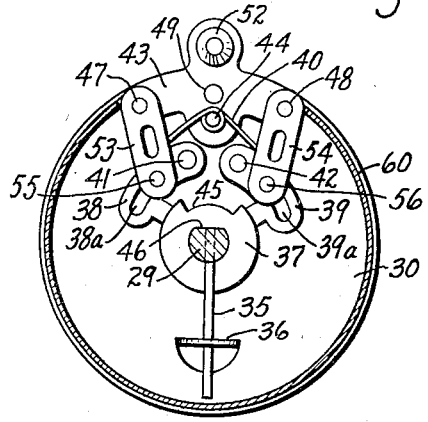
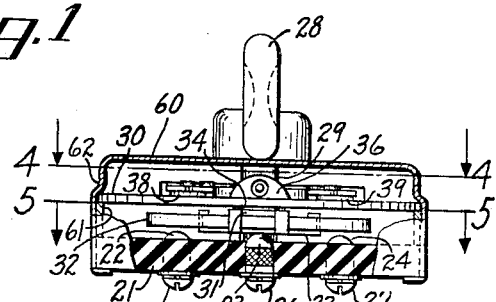
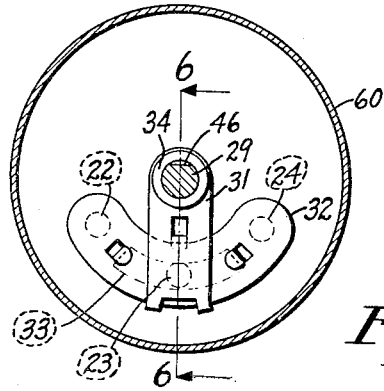
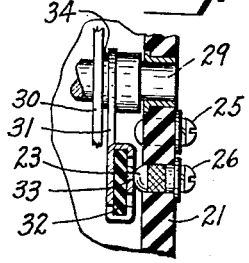
INVENTOR
Caryl E. Chaney
BY
Spencer Hardman & Fehr
his ATTORNEYs March 9, 1937. C. E. CHANEY 2,073,141

DIRECTION INDICATING SWITCH

Filed May 11, 1934 2 Sheets-Sheet 2

INVENTOR
Caryl E. Chaney
BY
Spencer Hardman & Fehr
his ATTORNEYS

Patented Mar. 9, 1937

2,073,141

UNITED STATES PATENT OFFICE 2,073,141

DIRECTION INDICATING SWITCH

Caryl Edmund Chaney, Highland Park, Mich., assignor to General Motors Corporation, Detroit, Mich., a corporation of Delaware Application May 11, 1934, Serial No. 725,060

5 Claims. (Cl. 200—59)

This invention relates to switches for controlling the circuits of a directional signal lamp system for vehicles.

It is an object of the invention to provide a switch which is manually set to indicate either a right-hand or left-hand turn and is automatically returned to circuit-open position in response to the turning of the steering wheel to the straight-course position after completing the turning of the vehicle.

In the disclosed embodiment of the invention this object is accomplished by providing a two-way switch having an intermediate "Off" position and two "On" positions attained by moving a switch contact in either direction from the "Off" position. This movable contact is maintained normally in "Off" position by a spring. The movable contact is retained by a latch device in either of its "On" positions. The latch device is released automatically by the latch release means including a member directly engageable with spokes of the steering wheel, said latch releasing means being non-operable to release the latch when the steering wheel is turned to steer the vehicle in the direction indicated, but operable to release the latch during the return of the steering wheel to straight-course position after the turning of the vehicle has been completed.

Further objects and advantages of the present invention will be apparent from the following description, reference being had to the accompanying drawings wherein a preferred embodiment of one form of the present invention is clearly shown.

In the drawings:

Fig. 1 is a side elevation of the switch involving the present invention, shown mounted on the steering column underneath the steering wheel part of which is broken away. Figs. 1 and 2 are drawn to a smaller scale than the other figures.

Fig. 2 is a plan view of the switch mounted on the steering column which is shown in section.

Fig. 3 is a view of the switch partly in section showing the assembly of the latch and switch mechanism, this being a view substantially as indicated by the arrow 3 of Fig. 1.

Fig. 4 is a plan view substantially as indicated by the line and arrows 4—4 of Fig. 3, showing the switch latching mechanism in its normal or "Off" position.

Fig. 5 is a plan view substantially as indicated by the line and arrows 5—5 of Fig. 3 illustrating the contact actuator mechanism in its normal or "Off" position.

Fig. 6 is a fragmentary view substantially as indicated by the line and arrows 6—6 of Fig. 5.

Figure 7:
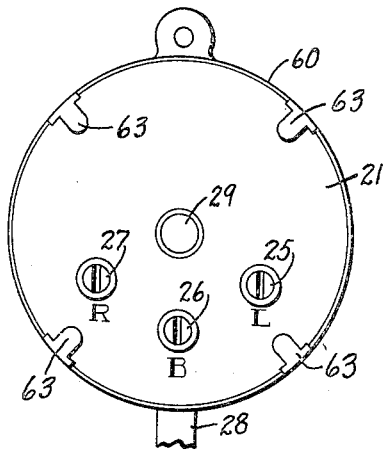
Fig. 7 is a plan view of the base showing the location of the switch terminal screws.

The switch is of the two-way rotary type and is designated in its entirety by numeral 20. The switch comprises a base 21 (see Fig. 3) of non-conducting material in which are secured a plurality of contacts 22, 23 and 24, arranged in an arcuate row and equally spaced. The outer end of contact 23 carries a screw terminal 26 connected with a battery; and the outer ends of contacts 22 and 24 carry screw terminals 25 and 27, respectively, to which the wires leading to the direction-indicating lights (not shown) are secured. The switch handle 28 is pinned to the smaller diameter of a shouldered shaft 29 and its larger diameter is journaled in the plate 30 and base 21. Slidably splined to shaft 29 by a flat portion 46 is a contact arm 31 to which is secured an insulating plate 32 and a conducting segment 33, these parts being held in contact with the battery contact 23 by the spring washer 34. By manual movement of the switch handle 28 to left or right, segment 33 will connect contact 23 with contact 22 or 24 respectively, thereby completing a circuit to a left-hand turn signal lamp or to a right-hand turn signal lamp.

The switch segment 33 is maintained in its normal or "Off" position by spring 35 (see Figure 4) one end of which is fastened to shaft 29 and the other end of which passes through the apertured flange 36 of plate 30.

The means for latching the switch segment in either of its "On" positions will now be described. Pivoted to plate 30 at 41 and 42 are dogs 38 and 39, which are urged against the periphery of the arcuate notched disc 37 by the ends of spring 40, coiled around stud 44 of rocker arm 43. The dogs 38 and 39 have arcuate slots 38a and 39a respectively, which receive pins 55 and 56 of links 53 and 54 respectively, thereby providing a sliding connection between the links and dogs. Links 53 and 54 are pivoted to rocker arm 43 at 47 and 48; and arm 43 is pivoted at 49. Movement of the switch handle 28 to right or left permits dog 38 or 39 respectively, to be urged into notch 45 by spring 40. Thus the contact actuator 31 is retained in one of these positions against the action of spring 35. The latch dogs 38 or 39 which retain the contact actuator 31 in either right or left position respectively, are released automatically upon returning the steering wheel 50 into position for driving in a straight course, through the use of a flexible rubber post 52 fastened to rocker arm 43 and adapted to be engaged by spokes 51 of the steering wheel. It will be understood that the switch 20 is so mounted on the steering post 70 by the means of the adjustable clamp bracket 71 that when the wheel 50 is in position for driving in a straight course the post 52 will be midway between adjacent spokes 51 of the wheel 50.

The structure is enclosed by a case 60 preferably of a sheet metal construction with lugs 63 formed under base 21 thereby clamping said base, spacing sleeve 61 and plate 30 between lugs and the flange 62 formed near the top face of the case 60, substantially as shown in Fig. 3. A portion of the case is cut away to allow movement of the rocker arm 43.

The switch as shown in Fig. 1 is fastened to a bracket by bolts or other devices which in turn is clamped to the steering column in a position conveniently accessible to the driver and rubber post 52 being located midway between spokes 51 of the wheel.

Figure 8:
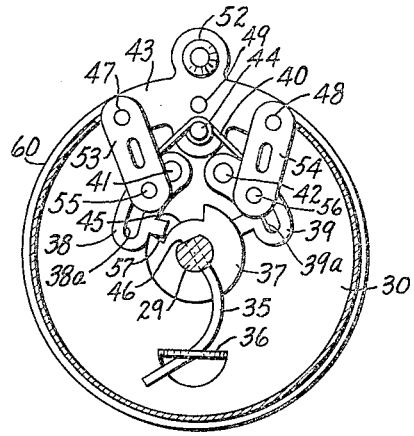
Fig. 8 is a plan view through the structure showing the switch latching mechanism held in its right-indicating position.
Figure 9:
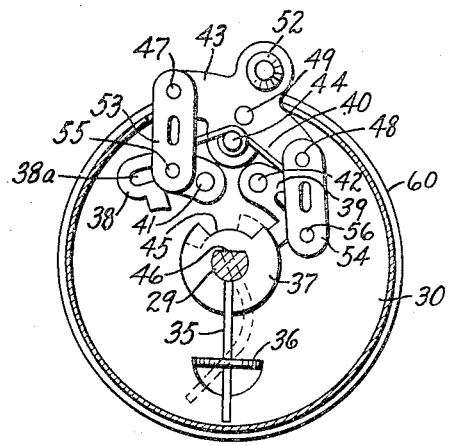
Fig. 9 is a plan view through the structure illustrating the releasing of switch from its right-indicating position.

The mode of operation of the present switch will now be described with particular reference to Figs. 8 and 9. When the driver wishes to indicate that a right turn is to be made he will move the lever 28, shown in Fig. 2, in a counterclockwise direction, or toward the letter "R", which is stamped on the switch case, as shown. The switch contact 33 is therefore moved in a counterclockwise direction so as to connect the battery contact or terminal 23 with the terminal 24. This is connected to the lamp which indicates at the rear of the car a right turn is about to be made. During this movement of the switch contact 33 the latch plate 37 is moved from position in full line shown in Fig. 9 to that shown in Fig. 8. During this movement of the latch plate 37 its notched portion 45 is moved so as to permit the latch dog 38 to move in this recess and to engage a stop surface or shoulder 57 of latch plate 37. The plate 37 is, therefore, retained in its position and hence the contact 33 in engagement with contacts 23 and 24. As the driver turns the steering wheel in a clockwise direction as viewed by the driver in order to turn the vehicle towards the right, the spokes of the vehicle wheel will engage the flexible post 52 thereby tending to move the lever 43 in a counterclockwise direction about its pivot 49. Should the lever 43 move in this direction the effect will be that the dog 39 may be lifted away from the latch plate 37, but the dog 38 will not be moved out of engagement with plate 37. As the lever 43 is moved counterclockwise the link 53 which is pivotally connected with pivot 47 of lever 43 will simply move its pin 55 along the arcuate slot 38a provided by the dog 38. Hence no movement of the dog 38 will take place. While the post 52 is flexible it is sufficiently stiff to transmit the motion from the spokes of the steering wheel to the links 53 and 54 in the manner explained. However, when the pin 55 has arrived at the lower end of the arcuate slot 38a thereby preventing further movement of the lever 43 due to the engagement of a spoke of the wheel with the post 52, the post 52 will bend and permit further movement of the spokes of the wheel. Hence, it is seen that the spokes of the wheel will successively engage the flexible post 52 and cause it to bend toward the left as viewed in Fig. 2.

After the turning of the vehicle has been completed and while the driver turns the wheel back to the straight-course position the spokes of the wheel will engage the post 52 from the left thereby causing the post 52 and lever 43 to be moved in a clockwise direction about the pivot 49. When this occurs the link 54 will carry its pin 56 downwardly along the slot 39a of the dog 39, while the link 53 will cause the dog 38 to be released from latch plate 37, as shown in Fig. 9. When this occurs the latch plate 37 will be returned from the dotted line position to the full line position shown in Fig. 9. Consequently the movable contact 33 will be returned to "Off" position as shown in Fig. 5.

It is apparent that the indication of a left turn can be effected by turning the switch handle 28 toward "L" marked on the switch case, as shown in Fig. 2. As has been explained with reference to indicating a right turn the lever 28 will be latched automatically in the left-turn position but will be automatically restored to normal position after the turning of the vehicle toward the left has been completed and in response to the returning of the steering wheel to straight-course position.

While the embodiment of the present invention as herein disclosed, constitutes a preferred form, it is to be understood that other forms might be adopted, all coming within the scope of the claims which follow.

What is claimed is as follows:

1. A two-way switch for controlling direction signals comprising, in combination, a battery terminal and lamp circuit terminals, a rotary, manually operable switch contact movable in either direction from an intermediate "Off" position for connecting one of the lamp circuit terminals with a battery, a single spring for maintaining the rotary contact normally in "Off" position, means for latching the rotary contact in either of its circuit-making positions, said means including a recessed latch plate rotatable with the rotary contact, a pair of dogs, a rocker arm, a spring carried by the rocker arm to press the dogs against the latch plate, a common means for releasing the dogs from engagement with the latch plate, said means including a movable member carried by the rocker arm and directly engageable with the spokes of a steering wheel, and means for transmitting motion from said member to said latch dogs pivoted on the rocker arm, said motion transmitting means including a lost-motion connection so constructed and arranged that during the turning of the steering wheel from straight-steering position in the indicated direction, the dog then retaining the latch plate will not be withdrawn from latching position, but that during the return of the steering wheel to straight-course position, said dog will be withdrawn from the latch plate.

2. A two-way switch for controlling direction signals comprising, in combination, a battery terminal and lamp circuit terminals, a rotary, manually operable switch contact movable in either direction from an intermediate "Off" position for connecting one of the lamp circuit terminals with a battery, a spring for maintaining the rotary contact normally in "Off" position, means for latching the rotary contact in either of its circuit-making positions, said means including a recessed latch plate rotatable with the rotary contact, a pair of dogs, a single spring for urging the dogs against the latch plate, and a common means for releasing the dogs from engagement with the latch plate, said means including a lever pivoted intermediate its ends and carrying a member directly engageable with the spokes of a steering wheel and links having respectively pivotal connections with the ends of said lever and lost-motion connections with said dogs.

3. A two-way switch for controlling directional signals comprising, in combination; a housing; a pair of spaced terminals; a movable contact adapted to engage either one of the terminals; a leaf spring for normally holding the movable contact out of engagement with the terminals; a latch plate rotatable with the movable contact and having a notch to provide a pair of shoulders; a pair of dogs pivoted on the housing; a rocker arm pivoted on the housing; a spring for urging the dogs toward each other; means for connecting the dogs with the rocker arm to permit either one of the dogs to move into the notch by the second mentioned spring and against one of the shoulders to releasably hold the movable contact in engagement with one of the terminals; and a yieldable rubber post carried by the rocker arm and engageable with portions of a steering wheel for moving the rocker arm to actuate the connecting means to release the dog from its locking engagement with the latch plate permitting the movable contact to return to its normal position.

4. A two-way switch for controlling directional signals comprising, in combination; a pair of spaced lamp terminals and a battery terminal; a movable contact adapted to engage either one of the lamp terminals with the battery terminal; resilient means for normally holding the movable contact out of engagement with the lamp terminals; a plate rotatable with the movable contact and having provisions to provide a plurality of shoulders; a pair of pivotally mounted dogs; a relatively movable arm; means for connecting the dogs with the movable arm; a single spring for urging the dogs toward each other, said spring operating to move one of the dogs against one of the shoulders when the plate is moved a certain distance in one direction to releasably hold the movable contact in engagement with one of the lamp terminals; and an elastic member carried by the arm and engageable with a rotatable member for moving the arm to actuate the means associated with the dog and the arm whereby movement of the arm causes the dog to move out of locking engagement with the plate to permit the movable contact to return to its normal position.

5. A two-way switch for controlling directional signals comprising in combination; a pair of spaced lamp terminals and a battery terminal; a rotary, manually operated switch contact movable in either direction of rotation from an intermediate "Off" position for connecting one of the lamp terminals with the battery terminal; a spring for normally maintaining the contact in "Off" position; a plate having a recess rotated with the contact; a pair of pivoted members; a second spring for urging the pivoted members against the periphery of the plate and operating to move one or the other of the members into the recess to releasably hold the plate when the contact is moved to either "On" position; a lever pivoted intermediate its ends, said lever carrying means adapted to lift the pivoted members from the recess permitting the contact to move into the "Off" position of the switch when the lever is turned upon its axis; and means for actuating the lever about its axis.

CARYL EDMUND CHANEY.